United States Patent [19]

Averill et al.

[11] Patent Number: 6,044,447
[45] Date of Patent: Mar. 28, 2000

[54] METHOD AND APPARATUS FOR COMMUNICATING TRANSLATION COMMAND INFORMATION IN A MULTITHREADED ENVIRONMENT

[75] Inventors: Duane Arlyn Averill; John Michael Borkenhagen; James Anthony Steenburgh; Sandra S. Woodward, all of Rochester, Minn.

[73] Assignee: International Business Machines Corporation, Armonk, N.Y.

[21] Appl. No.: 09/017,307

[22] Filed: Jan. 30, 1998

[51] Int. Cl.[7] ...................................................... G06F 12/00
[52] U.S. Cl. ........................... 711/207; 711/118; 711/154; 711/202; 711/208; 711/220
[58] Field of Search ................................ 711/3, 118, 154, 711/202, 205, 206, 207, 208; 712/220

[56] References Cited

U.S. PATENT DOCUMENTS

| 5,430,850 | 7/1995 | Papadopoulos et al. | 79/303 |
|---|---|---|---|
| 5,546,593 | 8/1996 | Kimura et al. | 712/228 |
| 5,636,364 | 6/1997 | Emma et al. | 711/140 |
| 5,809,450 | 9/1998 | Chrysos et al. | 702/186 |
| 5,835,705 | 11/1998 | Larsen et al. | 714/47 |
| 5,896,517 | 4/1999 | Wilson | 711/137 |
| 5,907,702 | 5/1999 | Flynn et al. | 709/108 |
| 5,923,872 | 7/1999 | Chrysos et al. | 712/244 |

OTHER PUBLICATIONS

U.S. Ser. No. 08/958,716, filed Oct. 23, 1997, entitled Method and Apparatus for Selecting Thread Switch Events in a Multithreaded Processor, by J.M. Borkenhagen et al.
U.S. Ser. No. 08/956,875, filed Oct. 23, 1997, entitled An Apparatus and Method to Guarantee Forward Progress in a Multithreaded Processor, by J.M. Borkenhagen et al.
U.S. Ser. No. 08/958,718, filed Oct. 23, 1997, entitled Altering Thread Priorities in a Multithreaded Processor, by J.M. Borkenhagen et al.
U.S. Ser. No. 08/956,577, filed Oct. 23, 1997, entitled Method and Apparatus to Force a Thread Switch in a Multithreaded Processor, by J.M. Borkenhagen et al.
U.S. Ser. No. 08/773,572, filed Dec. 27, 1996, entitled Background Completion of Instruction and Associated Fetch Request in a Multithreaded Processor, by J.M. Borkenhagen et al.
U.S. Ser. No. 08/761,378, filed Dec. 9, 1996, entitled Multi-Entry Fully Associative Transition Cache, by D.L. Freerksen et al.

(List continued on next page.)

*Primary Examiner*—Tuan V. Thai
*Attorney, Agent, or Firm*—Joan Pennington

[57] ABSTRACT

A method and apparatus are provided for communicating translation command information in a multithreaded environment in a computer system. The computer system includes a processor unit, an instruction unit coupled to the processor unit, a cache coupled to the processor unit, a main memory, and a storage control unit including a dataflow control partition, a cache control partition, a translation control partition. A translation miss signal is sent from the dataflow control partition to the translation control partition, responsive to detecting a translation miss condition. A translation command next signal is sent from the translation control partition to the cache control partition responsive to the translation miss signal. Then a translation command signal is sent from the translation control partition to the cache control partition. Responsive to the translation miss signal, a steal command signal is applied to the instruction unit for providing the translation command priority over execution of another thread. A series of the translation command signals are sent from the translation control partition to the cache control partition, and in one control cycle, the translation control partition can receive a translation command taken signal from the cache control partition for a translation command signal and can receive a translation data valid signal from the cache control partition for another translation command signal.

13 Claims, 7 Drawing Sheets

6,044,447
Page 2

OTHER PUBLICATIONS

U.S. Ser. No. 08/761,380, filed Dec. 9, 1996, entitled Method and Apparatus for Prioritizing and Routing Commands from a Command Source to a Command Sink, by D.L. Freerksen et al.

U.S. Ser. No. 08/761,379, filed Dec. 9, 1996, entitled Method and Apparatus for Tracking Processing of a Command, by D.L. Freerksen et al.

U.S. Ser. No. 08/473,692, filed Jun. 7, 1995, entitled Method and System for High Performance Multithread Operation in a Data Processing System, by R.J. Eickemeyer et al.

U.S. Ser. No. 08/675,315, filed Jul. 3, 1996, entitled Multithreaded Cell for a Memory, by A.G. Aipperspach et al.

U.S. Ser. No. 08/957,002, filed Oct. 23, 1997, entitled Thread Switch Control in a Multithreaded Processor System, by J.M. Borkenhagen et al.

TAGS ACTIVE MODE ADDRESSING

| | X0 | X4 | X8 | X 12 | 0 | 4 | 8 | 12 | 16 | 20 | 24 | 28 | 32 | 36 | 40 | 44 | 48 | 52 | 56 | 60 |
|---|---|---|---|---|---|---|---|---|---|---|---|---|---|---|---|---|---|---|---|---|
| EA | | | | | EA (0:35) | | | | | | | | | EA (36:63) | | | | | | |
| VA | ZEROS | | | | VA=EA (0:35) | | | | | | | | | VA=EA (36:63) | | | | | | |
| RA | | | | | | | | | | | | | RA (24:51) FROM TLB (FROM PTE) | | | | | RA=EA (52:63) | | |
| RA E=R, E=DS, RELOCATE OFF | | | | | | | | | | | | | RA (24:51) | | | | | RA=EA (52:63) | | |

FIGURE 4A

TAGS INACTIVE MODE ADDRESSING

| | X0 X4 X8 | X 12 | 0 | 4 | 8 | 12 | 16 | 20 | 24 | 28 | 32 | 36 | 40 | 44 | 48 | 52 | 56 | 60 |
|---|---|---|---|---|---|---|---|---|---|---|---|---|---|---|---|---|---|---|
| EA | | | EA (0:35) | | | | | | | | | EA (36:63) | | | | | | |
| VA | --- | | VA=EA (0:35) FROM SLB (FROM STE) | | | | | | | | | VA=EA (36:63) | | | | | | |
| RA (BAT HIT) | --- | | --- | | | | | | RA (24:46) FROM BAT | | | | | | RA=EA (47:63) | | | |
| RA (NO BAT HIT) | --- | | --- | | | | | | RA (24:51) FROM TLB (FROM PTE) | | | | | | | RA=EA (52:63) | | |
| RA E=R, E=DS, RELOCATE OFF | --- | | --- | | | | | | RA=EA (24:51) | | | | | | | RA=EA (52:63) | | |

TRANSLATION CMD 600

| ENCODE 602 | DESCRIPTION 604 |
|---|---|
| 000 | NOOP 606 |
| 001 | FETCH STE/PTE 608 |
| 010 | BYTE STORE 610 |
| 011 | RESERVED 612 |
| 100 | TLB UPDATE FOR TLB PARITY ERRORS 614 |
| 101 | TLBIE REQUEST 616 |
| 110 | RESERVED 618 |
| 111 | RESERVED 620 |

FIGURE 7

EXAMPLE TIMING FOR FETCH PTE

METHOD AND APPARATUS FOR COMMUNICATING TRANSLATION COMMAND INFORMATION IN A MULTITHREADED ENVIRONMENT

RELATED APPLICATION

The present invention relates to U.S. patent application Ser. No. 08/957,002 filed Oct. 23, 1997, entitled THREAD SWITCH CONTROL IN A MULTITHREADED PROCESSOR SYSTEM (RO996-042) and assigned to the present assignee. The subject matter of the above identified patent application is incorporated herein by reference.

FIELD OF THE INVENTION

The present invention relates to the data processing field, and more particularly, relates to a method and apparatus for communicating translation command information in a multithreaded environment in a computer system.

DESCRIPTION OF THE RELATED ART

In order to reduce data access time, special purpose high-speed memory spaces of static random access memory (RAM) called a cache are used to temporarily store data which are currently in use. For example, the cached data can include a copy of instructions and/or data obtained from main storage for quick access by a processor. A processor cache typically is positioned near or integral with the processor. Data stored in the cache advantageously may be accessed by the processor in only one processor cycle retrieving the data necessary to continue processing; rather than having to stall and wait for the retrieval of data from a secondary memory, such as a higher level cache memory or main memory.

Another cache example is the buffer memory included an input/output (I/O) bridge chip. An I/O bridge chip provides the connection between two different data buses in a computer system. Also an I/O bridge chip can be part of an input/output processor (IOP). An I/O bridge chip typically contains a cache, registers, and the components necessary to connect two different buses together. Data flows to and from devices connected to one of the buses, through the bridge chip and its cache and to and from another bus, which might be connected to a different device or host computer. An example of such a configuration is a host computer with a host bus connected to a bridge chip, which is further connected to another bus that attaches multiple I/O processors.

When the processor requests a data item or word from memory, the cache is accessed when the processor processes a memory access instruction. If the desired word, for example, data or program instruction, resides in the cache, this is called a cache hit and the desired word is read from the cache. If the desired data or program instruction is not found in the cache, this is a called cache miss. With a cache miss, secondary memory is accessed to read that word, and a block of words containing that word is transferred from the main memory to the cache and the processor. A cache miss causes the processor to wait or creates a stall, degrading system performance.

Various techniques are known for mapping blocks of main memory into the cache. Known methods of mapping main memory and cache addressing include a direct mapping cache configuration, a set-associative cache configuration, and a fully associative cache configuration. The physical locations that make up the cache are called cache blocks or lines. Each cache block has a tag or a set of address tags associated with it.

A program references storage using an effective address computed by the processor when it executes a load, store, branch, or cache instruction, and when it fetches the next sequential instruction. The effective address is translated to a real address according to predefined translation procedures. To minimize address translation time, a specialized cache dedicated to address translation called a translation lookaside buffer (TLB) typically is used for address translations.

A need exists for an improved method and apparatus for translation miss processing in a computer system having multithreaded execution capability. It is desirable to provide such improved method and apparatus for translation miss processing that is simple to implement and that optimizes computer system performance in the multithreaded environment giving translation miss processing priority over thread switching.

SUMMARY OF THE INVENTION

A principal object of the present invention is to provide a method and apparatus for communicating translation command information in a multithreaded environment in a computer system. Other important objects of the present invention are to provide such method and apparatus for communicating translation command information in a multithreaded environment in a computer system substantially without negative effect and that overcome many of the disadvantages of prior art arrangements.

In brief, a method and apparatus are provided for communicating translation command information in a multithreaded environment in a computer system. The computer system includes a processor unit, an instruction unit coupled to the processor unit, a cache coupled to the processor unit, a main memory, and a storage control unit including a dataflow control partition, a cache control partition, a translation control partition. A translation miss signal is sent from the dataflow control partition to the translation control partition, responsive to detecting a translation miss condition. A translation command next signal is sent from the translation control partition to the cache control partition responsive to the translation miss signal. Then a translation command signal is sent from the translation control partition to the cache control partition.

In accordance with features of the invention, responsive to the translation miss signal, a steal command signal is applied to the instruction unit for providing the translation command priority over execution of another thread. A series of the translation command signals are sent from the translation control partition to the cache control partition, and in one control cycle, the translation control partition can receive a translation command taken signal from the cache control partition for a translation command signal and can receive a translation data valid signal from the cache control partition for another translation command signal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
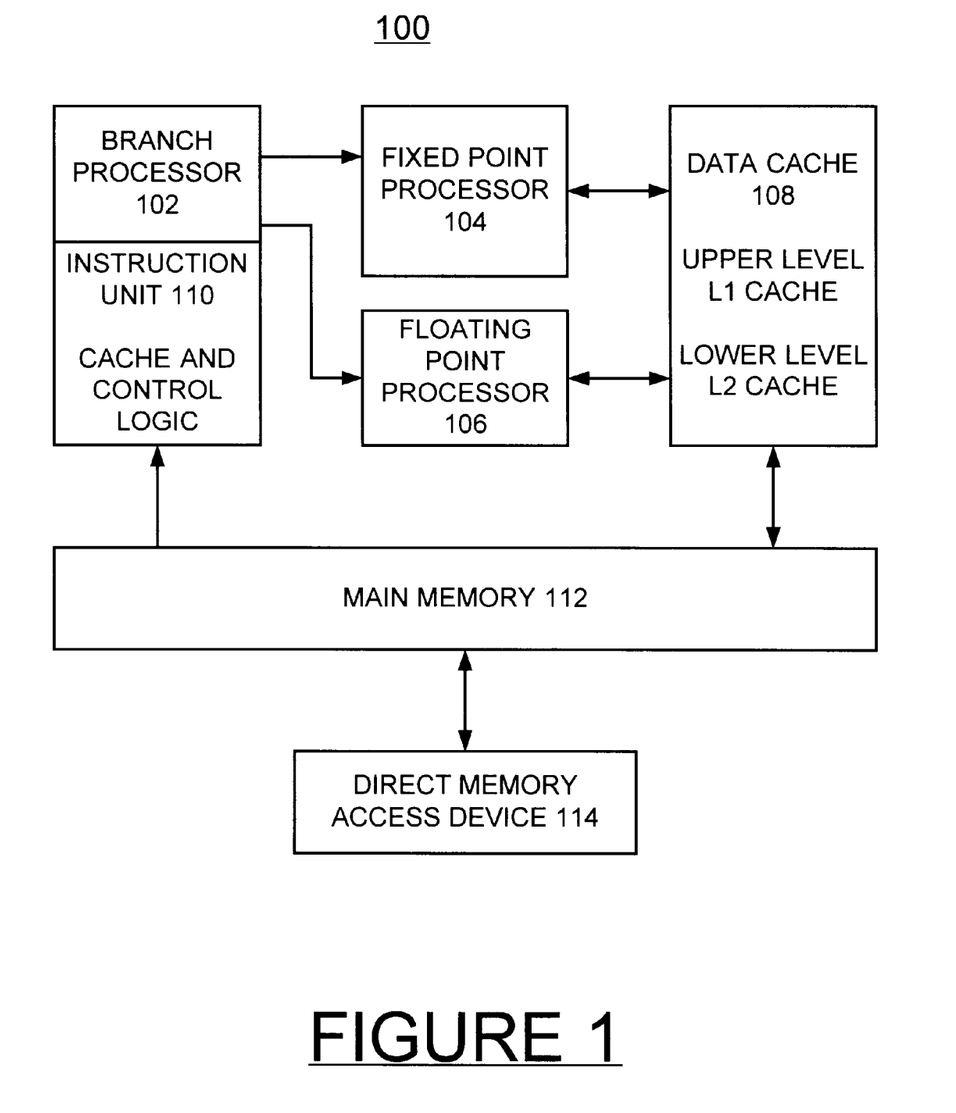
FIG. 1 is a block diagram representation of a computer system embodying the present invention.
Figure 2:
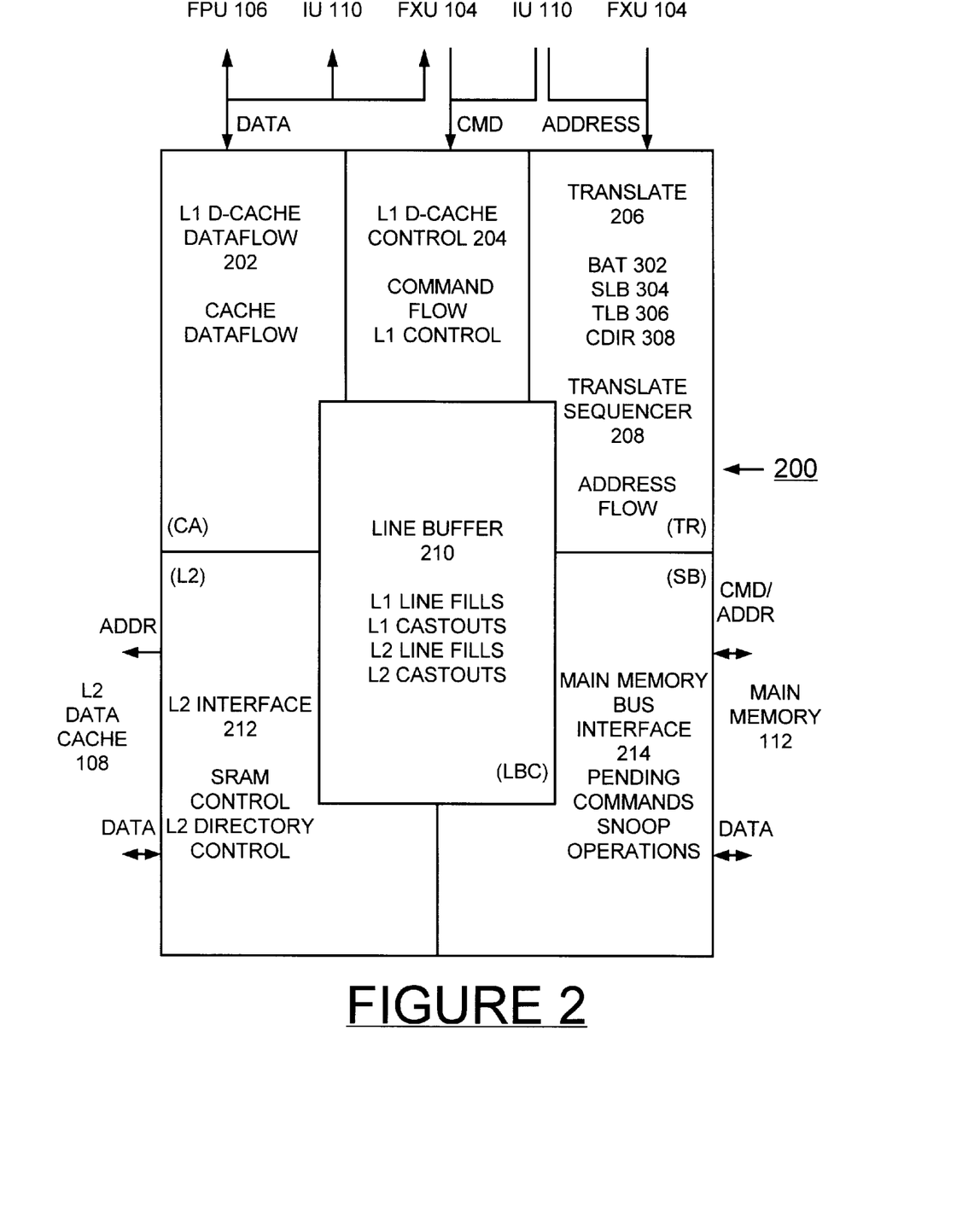
FIG. 2 is a block diagram representation of a storage control unit (SCU) of the computer system of FIG. 1 in accordance with the preferred embodiment.

Having reference now to the drawings, in FIGS. 1 and 2, there is shown a computer system in which a preferred embodiment may be implemented generally designated by the reference character 100 including a storage control unit generally designated by the reference character 200 in FIG. 2. As shown in FIG. 1, the computer system 100 includes a branch processor 102, a fixed point processor 104, and a floating point processor 106. Computer system 100 includes a data cache 108 and an instruction unit 110 coupled between the processors 102, 104, and 106 and a main memory 112. The data cache 108 includes an upper level L1 cache and a lower level L2 cache. The instruction unit 110 includes an instruction cache together with control logic. Computer system 100 includes a direct memory access device 114 coupled to the main memory 112. Computer system 100 has multithreaded execution capability.

Referring to FIG. 2, storage control unit (SCU) 200 includes an L1 D-CACHE dataflow partition 202 for controlling cache dataflow with the fixed point processor 104, the floating point processor 106, and the instruction cache 110. Storage control unit (SCU) 200 includes an L1 D-CACHE control partition 204 for controlling command flow and L1 control with the fixed point processor 104 and the instruction unit 110. Storage control unit (SCU) 200 includes a translation control partition 206 for controlling address flow with the fixed point processor 104 and the instruction unit 110. The translation control partition 206 includes a block address translation (BAT) 302, a segment lookaside buffer (SLB) 304, a translation lookaside buffer (TLB) 306, a cache directory (CDIR) 308 and a translate sequencer 208. Storage control unit (SCU) 200 includes a line buffer partition 210 queuing L1 line fills, L1 castouts, L2 line fills, and L2 castouts and providing an interface to the main memory 112. Storage control unit (SCU) 200 includes an L2 interface 212 for SRAM control and L2 directory control of address and data with the L2 data cache 108. A main memory bus interface 214 for controlling pending commands and snoop operations and communicating command/address and data with a bus connected to the main memory 112.

In accordance with features of the invention, to optimize system performance in the multithreading execution in computer system 100, the translation miss processing of data in the local cache 108 is given priority over thread switching. To optimize the storage control pipeline, a translation command next signal (TranslationCmdNext) is generated and applied by the translation control partition 206 to the cache control partition 204 when a translation command is coming. A very high level design language (VHDL) implementation of the preferred embodiment uses the TranslationCmdNext to allow the cache control partition 204 to get the storage control pipeline ready for the oncoming translation command and address. The VHDL implementation of the preferred embodiment allows a subsequent stage 1 of a Fetch PTE/STE (Page Table Entry/Segment Table Entry) translation command to occur in the same cycle as a preceding stage 3 of a Fetch PTE/STE translation command. The VHDL implementation of the preferred embodiment raises a steal signal to stall the processor pipeline after a valid translation miss to allow the Fetch PTE/STE or Byte Store translation command to have priority over thread switching for execution of another thread.

Figure 3:
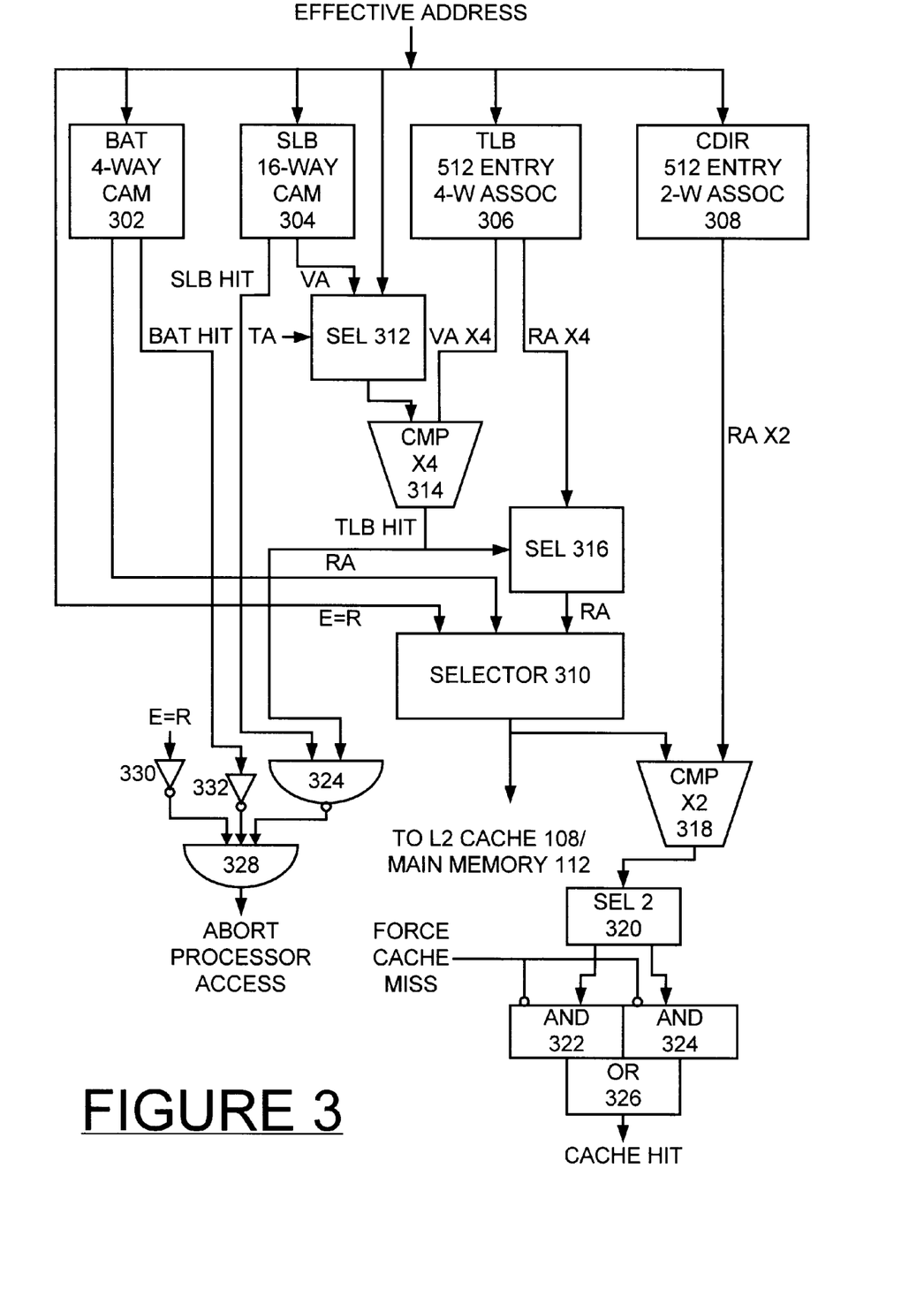
FIG. 3 is a schematic and block diagram representation of effective address translation logic in the computer system of FIG. 1 in accordance with the preferred embodiment.

Referring to FIG. 3, an effective address indicated at a line EFFECTIVE ADDRESS simultaneously is applied to the block address translation (BAT) 302, segment lookaside buffer (SLB) 304, translation lookaside buffer (TLB) 306, cache directory (CDIR) 308 of the translation control partition 206. An effective address corresponding to a real address indicated at a line E=R is applied to a selector 310 and is used to access storage L2 cache 108 or main memory 112.

An effective address that translates successfully via the Block Address Translation 302 is converted directly into a real address indicated at output line RA of the BAT 302 and applied to the selector 310 and is then used to access storage L2 cache 108 or main memory 112. For accesses that are mapped by a segmented address translation, a virtual address provided at the output of the content addressable memory SLB 304 is applied to a selector 312 indicated at a line VA. The effective address is applied to the selector 312 with a tag active control input applied to the selector 312 indicated at a line TA.

For example as shown in FIG. 3, the TLB 306, is a 4-way associative cache including 128 memory locations, each having four address entries for a total of 512 entries. At the output of TLB 306 at a line VA X4, four virtual addresses are provided to a compare by four (CMP X4) 314 for comparison four at a time with the virtual address output of selector 312. A match output of the CMP X4 314 indicated at a TLB HIT is applied to a selector 316 receiving a real address provided by the TLB 306 indicated at a line RA X4. Selector 316 applies the matching real address indicated at a line RA at the output of the selector 316 to the selector 310 and is then used to access storage L2 cache 108 or main memory 112.

A 512 entry 2-way associative cache can implement the cache directory (CDIR) 308, as shown in FIG. 3. At the output of CDIR 308 at a line RA X2, two real addresses are provided to a compare by two (CMP X2) 318 for comparison two at a time with the real address output of selector 310 and applied to a selector (SEL 2) 320. The outputs of SEL 2 320 are ANDED with an inverted FORCE CACHE MISS signal by a pair of AND gates 322 and 324. The outputs of AND gates 322 and 324 are applied to an OR gate 326 to provide a CACHE HIT signal.

An abort processor access logic includes a pair of inverters 330, 332 respectively receiving the E=R and BAT HIT signals. The SLB HIT and TLB HIT signals are applied to a NAND gate 324. The outputs of inverters 330, 332 and NAND gate 324 are ANDED by an AND gate 328 to provide an abort processor access signal if not a BAT HIT, TLB HIT, or SLB HIT, or not an E=R address access.

Figure 4A:
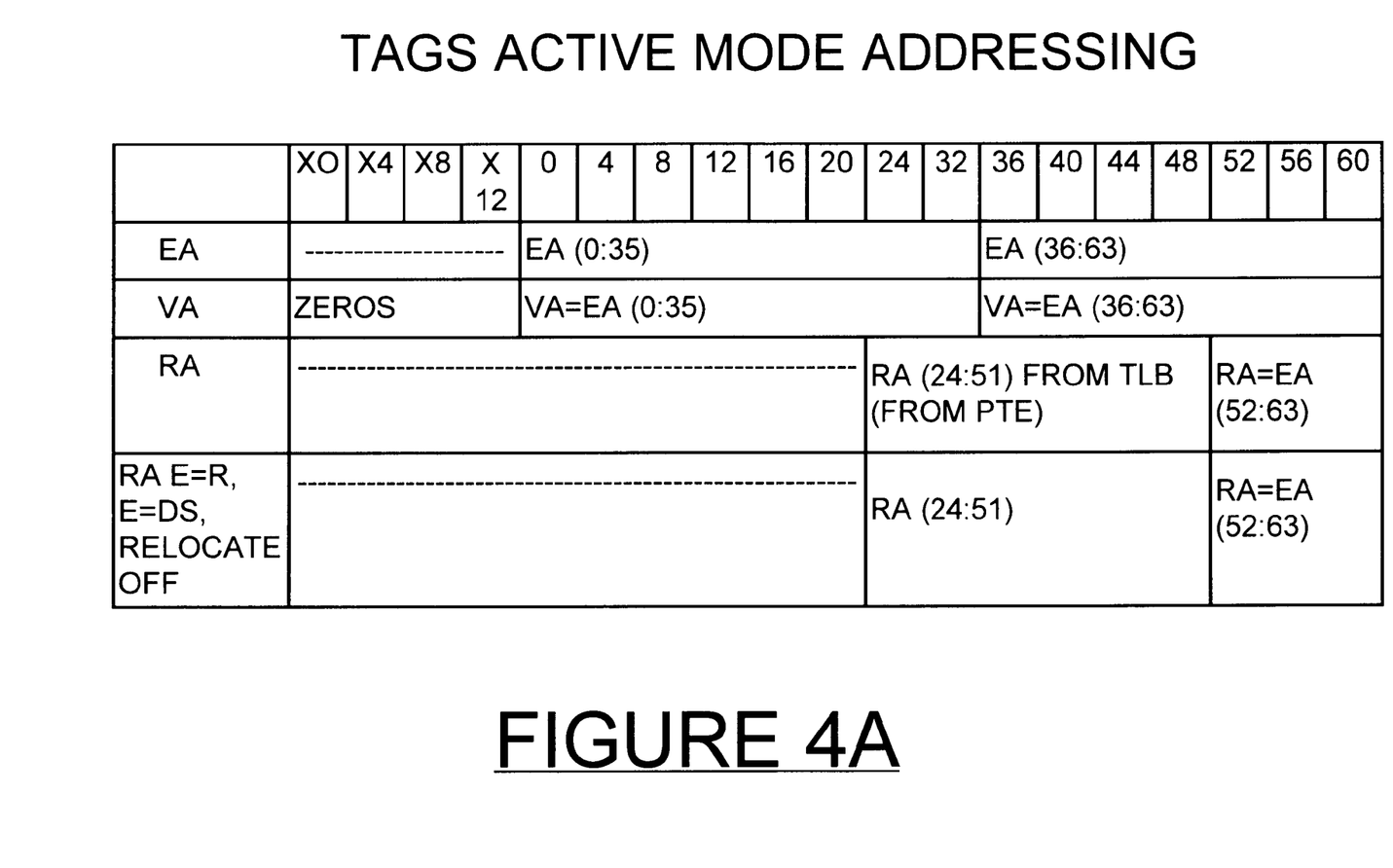
FIGS. 4A and 4B are addressing tables for the effective address translation logic of FIG. 3 respectively illustrating tags active mode addressing and tags inactive mode addressing in accordance with the preferred embodiment.
Figure 4B:
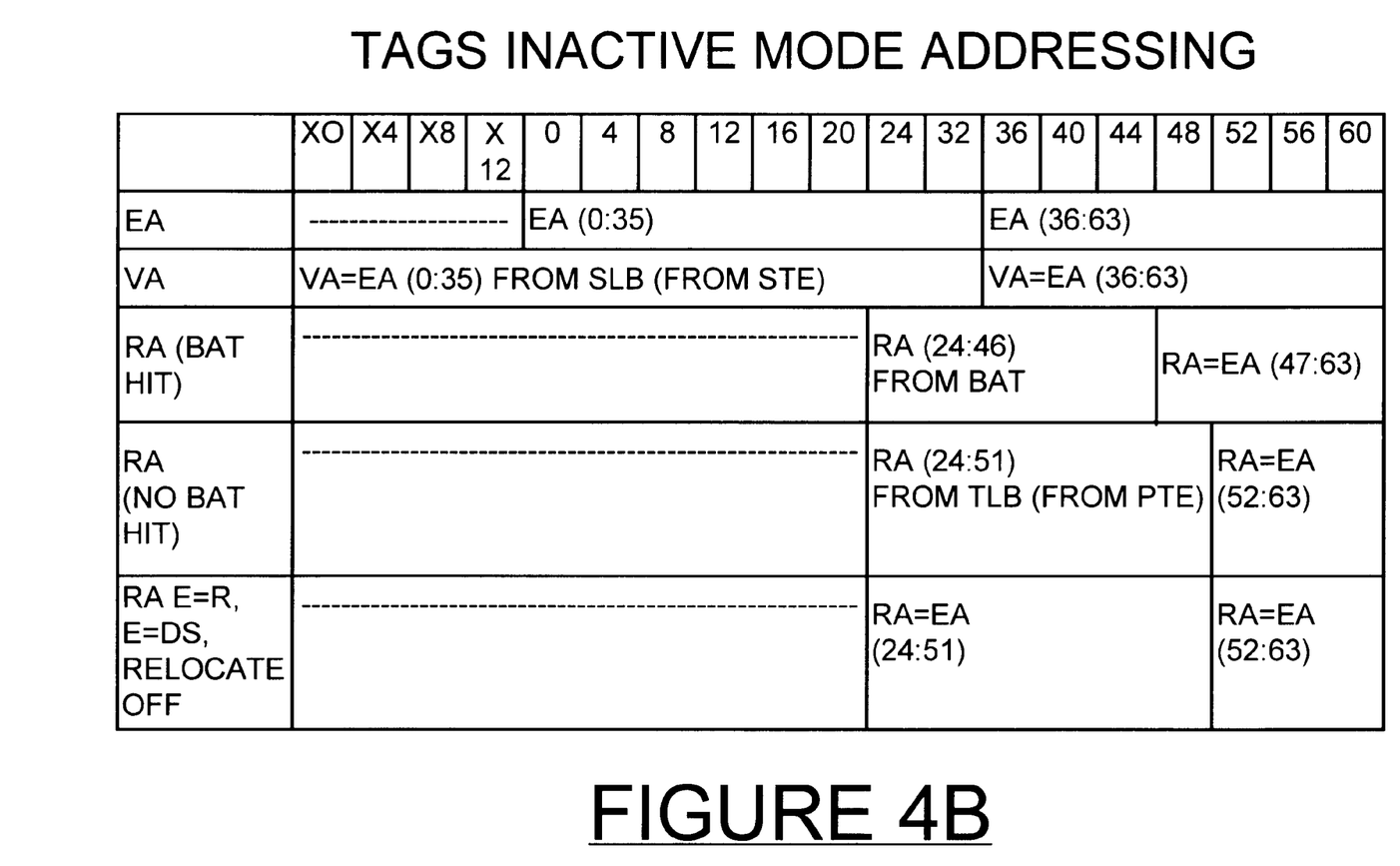

Referring to FIGS. 4A and 4B, there are shown addressing tables respectively illustrating tags active mode addressing and tags inactive mode addressing. An exemplary address translation for the computer system 100 is the translation of a 64-bit effective address (EA) to an 80-bit virtual address (VA) to a 40-bit real address (RA). It should be understood that the present invention is not limited to the exemplary address lengths described in this example and any bit length for any of the addresses is possible. For the purposes of this discussion all addresses will be assumed to be 80 bits in length numbered from 0 to 79. The addresses of less than the 80 bits are right justified with the most significant bits (MSBs) filled in with zeros. For example, the 40 MSBs of the 80-bit RA will be zero and the RA occupies bit positions 40–79.

Address translation can be accomplished in two ways. In the tags active mode addressing illustrated in FIG. 4A, the SLB 304 is not used, where the VA is equal to the EA with the MSBs set to zero. In the tags inactive mode addressing illustrated in FIG. 4B, the segment lookaside buffer (SLB) 304 is used. The SLB 304 does the translation from EA to VA. With a BAT HIT, the BAT 302 does the translation from EA to RA. With no BAT HIT, the translation lookaside buffer (TLB) 306 does the translation from VA to RA in both the tags active mode addressing of FIG. 4A and tags inactive mode addressing 4B. When the effective address is an E=R address (real address), or the effective address is an E=DS address (direct store address), or relocate is off, then the real address is set to the effective address.

The translation process from EA to VA to RA is the process used if translation is successful. If the translation is not successful, then a Translation Miss signal is activated. Translation would be unsuccessful if one of the following happened during the translation process:
1) There was no matching entry found in the SLB array 304.
2) There was no matching entry found in the TLB array 306.
3) The Tag Summary or Change Bit was not set in the matching TLB entry.
4) A storage fault was detected during translation.
5) There was a parity error detected in one or more of the classes at the TLBAddr (TLB Address) that was accessed during the translation process. For example, the TLBAddr is a hashed address generated from (VA(52:55) XOR VA(61:64)) concatenated with VA(65:67).

In accordance with features of the preferred embodiment, the translation dataflow partition 202 detects a Translation Miss condition and informs the translation control partition 206 of the condition. The translation logic has more work to do before the Effective Address that it was given can be translated and initiates translation commands to continue the translation process. The translation control partition 206 implements a method communicating to the cache control partition 204 so that the translation commands are efficiently processed in the storage control pipeline unit 200. Also, when a Translation Lookaside Buffer Invalidate Entry (TLBIE) request is received, the translation control partition 206 communicates to the cache control partition 204 so that the TLBIE command is processed in the storage control pipeline. The communication signals including TranslationCmdNext and the encoded TranslationCmd signals are now described in detail.

Figure 5:
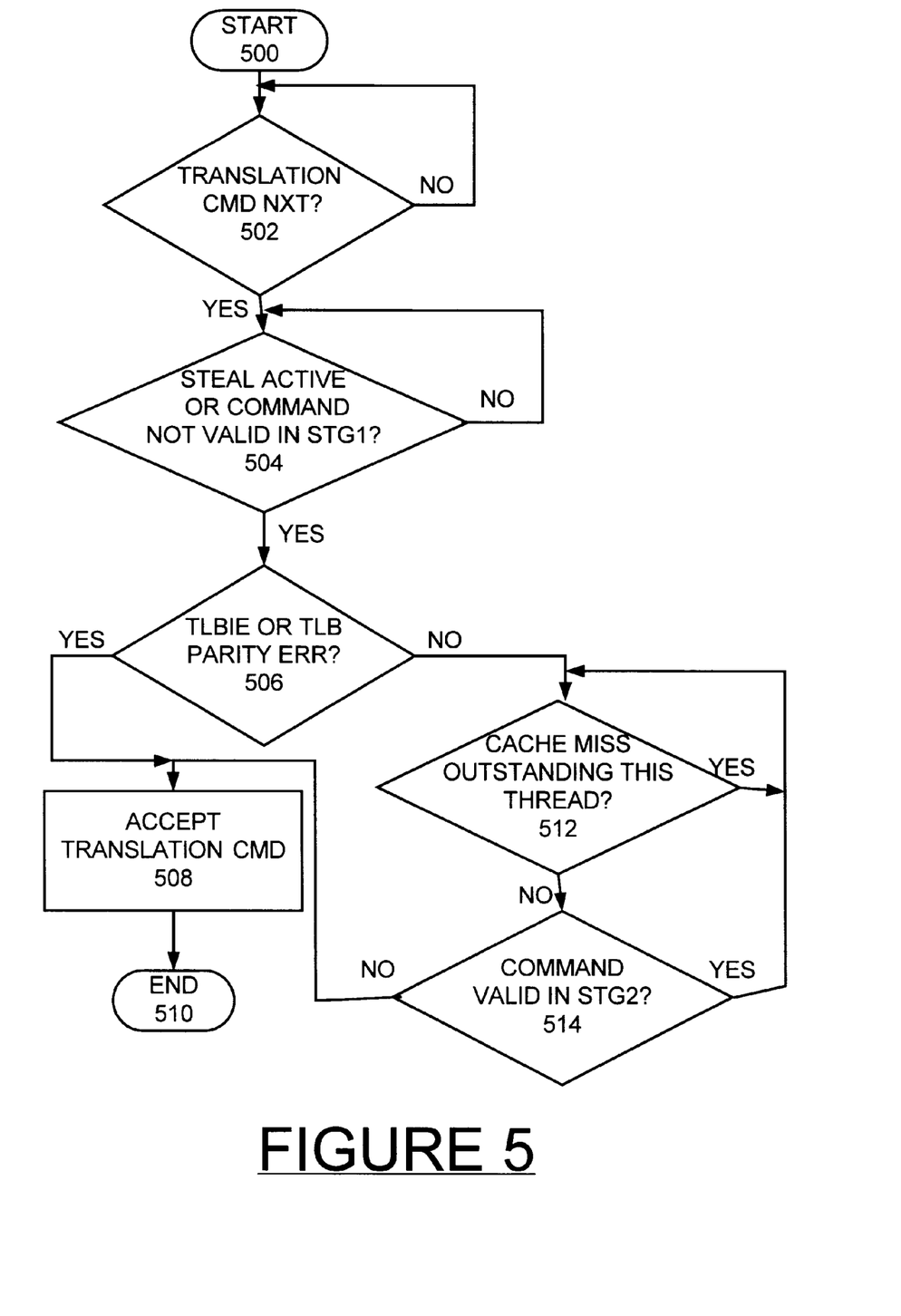
FIG. 5 is a flow chart illustrating sequential steps for communicating translation command information in the multithreaded environment in the computer system of FIG. 1 in accordance with the preferred embodiment.

Referring to FIG. 5, sequential steps for communicating translation command information in the multithreaded environment of the computer system 100 in accordance with the preferred embodiment start as indicated at a block 500. Monitoring for the TranslationCmdNext signal is performed as indicated at a decision block 502.

The TranslationCmdNext is sent by the translation control partition 206 to the cache control partition 204. The TranslationcmdNext signal is active during the cycle before a new translation command and address is to be sent. Activating the TranslationCmdNext signal allows the cache control partition 204 to get the storage control pipeline ready for the oncoming translation command and address.

When the TranslationCmdNext signal is identified at decision block 502, checking for an active Steal command signal or a command not valid signal in stage 1 of the SCU 200 pipeline is performed as indicated at a decision block 504. When an active Steal command signal or the command not valid signal in stage 1 of the SCU 200 pipeline is found at decision block 504, then checking for either the Translation Lookaside Buffer Invalidate Entry (TLBIE) request or TLB parity error is performed as indicated at a decision block 506. When either the Translation Lookaside Buffer Invalidate Entry (TLBIE) request or TLB parity error is identified at decision block 506, then a translation command TranslationCmd(0:2) is accepted as indicated at a block 508. This completes the sequential steps as indicated at a block 510. If either the Translation Lookaside Buffer Invalidate Entry (TLBIE) request or TLB parity error is not identified at decision block 506, then checking whether a cache miss is outstanding for this thread is performed as indicated at a decision block 512. When cache miss is not outstanding for this thread, then checking for a command valid signal in stage 2 of the SCU 200 pipeline is performed as indicated at a decision block 514. When the command valid signal in stage 3 of the SCU 200 pipeline is not found at decision block 514, then the translation command TranslationCmd (0:2) is accepted at block 508 to complete the sequential steps.

Figure 6:
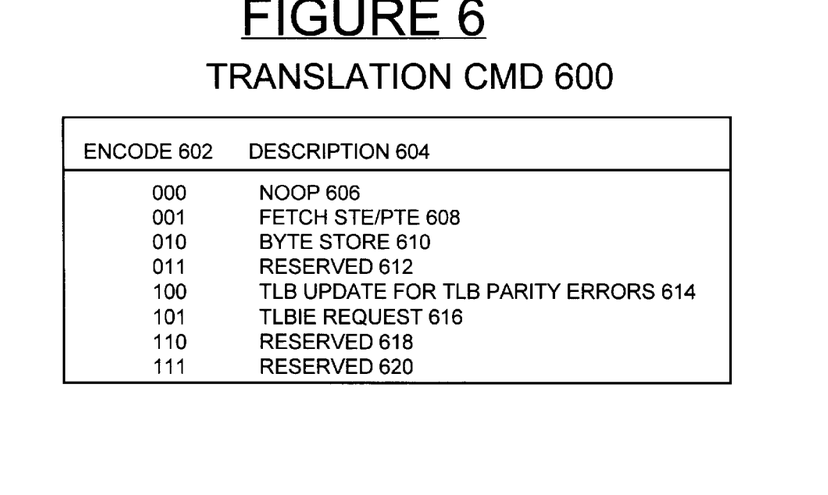
FIG. 6 is a chart illustrating encoded translations commands in accordance with the preferred embodiment.

The TranslationCmd(0:2) is an encoded translation command sent from the translation control partition 206 to the cache control partition 204. The TranslationCmd(0:2) command in the preferred embodiment is encoded. Alternatively, a separate signal can be activated for each of the encoded translation commands. TranslationCmd(0:2) is valid until the cycle of TranslationCmdTaken for non-fetch commands. The TranslationCmd(0:2) command will be valid for the Fetch STE/PTE (Page Table Entry/Segment Table Entry) translation command until the cycle of a valid STE or PTE search match, or until the translation logic finds that the entry does not exist in system memory. The TranslationCmd (0:2) encodes are shown in FIG. 6 and the TABLE 1 below.

TABLE 1

| TranslationCmd(0:2) 600 | |
|---|---|
| Encodes 602 | Description 604 |
| 000 | Noop 606 |
| 001 | Fetch STE/PTE 608 |
| 010 | Byte Store 610 |
| 011 | Reserved 612 |
| 100 | TLB update for TLB parity errors 614 |
| 101 | TLBIE request 616 |
| 110 | Reserved 618 |
| 111 | Reserved 620 |

The Fetch STE/PTE translation command 608 is sent for the following situations: 1) There was no matching entry found in the SLB array 304. 2) There was no matching entry found in the TLB array 306. 3) Refetch PTE after Byte Store to Set Change and/or Tag Summary bits.

The Byte Store translation command 610 is sent for the following cases: 1) After a PTE search match, the matching PTE does not have the reference bit set. 2) The Tag summary or Change Bit was not set in the matching TLB entry.

The TLB update for TLB parity errors translation command 614 is sent for the following cases: 1) There was a parity error detected in one or more of the classes at the TLBAddr (TLB Address) that was accessed during the translation process.

The TLBIE request translation command 616 is sent for the following cases: 1) A TLBIE request was received.

The following command sequences are valid between a Translation Miss and the translation control sequencer 208 being idle:
1) TableWalk (a series of loads consisting of Fetch STE/PTE translation commands 608);
2) TableWalk, Byte Store to set Reference Bit;
3) Byte Store to set the Change Bit, Refetch (Fetch STE/PTE to load updated PTE entry in the TLB);
4) Byte Store to set the Tag Summary bit, Byte Store to set the Change Bit Refetch; and
5) TLB Parity Error.

The TLBIE command can occur anytime.

Figure 7:
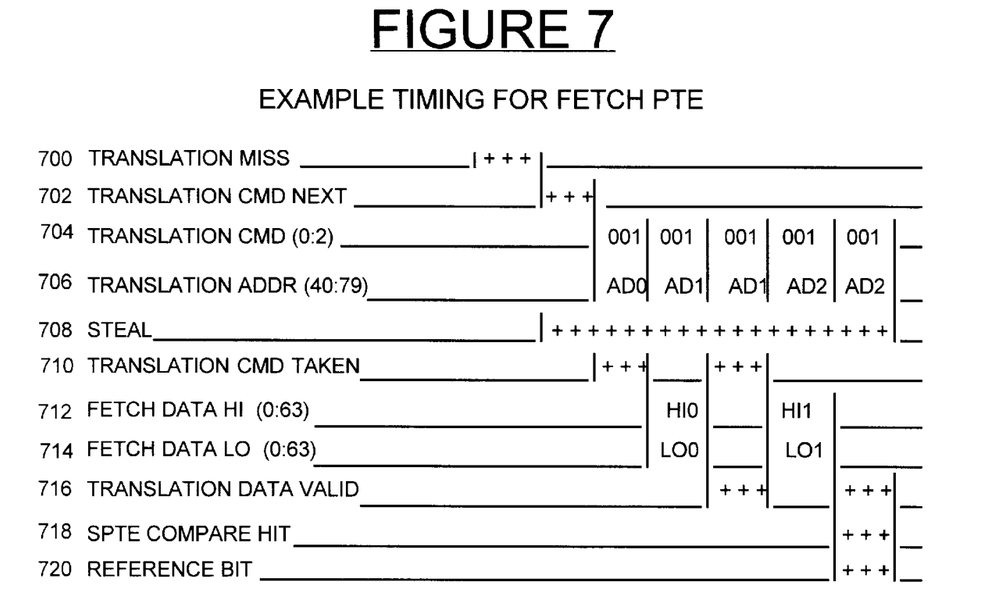
FIG. 7 is a chart illustrating exemplary timing command sequence for a fetch page table entry (PTE) translation command in accordance with the preferred embodiment.

FIG. 7 illustrates an exemplary timing command sequence for a Fetch PTE translation command of the command signals including TranslationMiss at 700, TranslationCmdNext at 702, TranslationCmd(0:2) at 704, TranslationAddr(40:79) at 706, Steal at 708, TranslationCmdTaken at 710, FetchDataHi(0:63) at 712, FetchDataLo (0:63) at 714, TranslationDataValid at line 716, SPTECompareHit at 718 and ReferenceBit at 720.

Having reference to line 708 in FIG. 7, the steal command signal is sent from the cache control partition 204 to the instruction processing unit 110. If a thread gets a Translation Miss, the other thread will only be allowed to execute if the Translation Miss thread gets a load cache miss during a TableWalk. When a load cache miss is encountered, the thread used for the Translation Miss must wait for valid data to be returned. In this situation, a thread switch advantageously is allowed. This rule is enforced by activating Steal to stall the processor pipeline and allow the translation command to be executed. Steal for this case will be activated for a Translation Miss under the following conditions:
1) Translation miss detected as indicated at line 700 in FIG. 7.
2) Restarting the translate load after a cache miss.
   Steal will be reset for this case when:
   1) TableWalk PTE search match with reference bit set;
   2) Translation control sequencer is idle;
   3) Fault encountered due to the STE or PTE entry does not exist in system memory; or
   4) Thread switch is being requested by the instruction unit 110 and TableWalk load cache miss.

Having reference to line 706 in FIG. 7, the TranslationAddr(40:79) is sent from the translation dataflow partition 202 to the cache control partition 204. TranslationAddr is the real address for a Fetch STE/PTE translation command 608 or for a Byte Store translation command 610. TranslationAddr is used by the cache dataflow partition 202 when TranslationCmdTaken is active, which means the translation command and address is in stage 1 of the storage control pipeline.

Having reference to line 710 in FIG. 7, the TranslationCmdTaken is sent from the cache control partition 204 to the translation control partition 206. When TranslationCmdTaken is active, the TranslationCmd(0:2) and TranslationAddr(40:79) currently being sent this cycle are taken. A new TranslationCmd(0:2) and TranslationAddr (40:79) can be sent the next cycle. The TranslationCmdTaken signal means the translation command is in stage 1 of the storage control pipeline.

StoreByte(0:7) is sent from the translation dataflow partition 202 to the cache control partition 204. StoreByte(0:7) is the byte of store data for a Byte Store translation command 610 and is valid when this translation command is in stage 2 of the storage control pipeline.

Having reference to lines 712 and 714 in FIG. 7, the FetchDataHi(0:63) and FetchDataLo(0:63) are sent from the cache dataflow partition 202 to the translation dataflow partition 206 when a Fetch STE/PTE translation command 608 is in stage 2 of the storage control pipeline.

Having reference to line 716 in FIG. 7, the TranslationDataValid is sent from the cache control partition 204 to the translation control partition 206 and translation dataflow partition 202. When the TranslationDataValid signal is active, the translation command 600 is in stage 3 of the storage control pipeline and valid fetch data (for a PTE or STE search) was sent the previous cycle.

Having reference to line 718 in FIG. 7, the SPTECompareHit is sent from the translation dataflow partition 202 to the cache control partition 204 and translation control partition 206. The same compare logic is used for the STE compare and PTE compare with the appropriate data multiplexed to each side of the compare. SPTECompareHit is the latched result of the STE or PTE search compare. There is a valid STE or PTE search match when SPTECompareHit at line 718 and TranslationDataValid at line 716 are both active. When TranslationDataValid is active and SPTECompareHit is inactive for a Fetch STE/PTE translation command, the cache control partition 204 activates TranslationCmdTaken at line 710 to allow the next Fetch STE/PTE to proceed down the storage control pipeline.

Having reference to line 720 in FIG. 7, the ReferenceBit is sent from the translation dataflow partition 202 to the cache control partition 204 and translation control partition 206. The ReferenceBit is valid for the cycle of a valid STE or PTE search match for Fetch STE/PTE translation commands. It is the reference bit of the matching Page Table Entry for a valid PTE search match and is forced active for a valid STE search match. When this signal is inactive, it indicates to the cache control partition that it should keep Steal active since a Byte Store translation command will be coming.

While the present invention has been described with reference to the details of the embodiments of the invention shown in the drawing, these details are not intended to limit the scope of the invention as claimed in the appended claims.

What is claimed is:

1. Apparatus for communicating translation command information in a multithreaded environment in a computer system including a processor unit, an instruction unit coupled to said processor unit, a cache coupled to said processor unit, and a main memory, said apparatus comprising:
   dataflow control means for controlling dataflow,
   cache control means for controlling command flow,
   translation control means for controlling address flow;
      said translation control means including means responsive to a translation miss condition for applying a translation miss signal to said cache control means; and
      means responsive to said translation miss signal for applying a translation command signal to said cache control means;
   wherein said translation command signal is an encoded signal for one of a Fetch STE/PTE (Page Table Entry/ Segment Table Entry) command signal, a Byte store command signal, a translation lookaside buffer (TLB) update for TLB parity errors, and a Translation Lookaside Buffer Invalidate Entry (TLBIE) request command signal.

2. Apparatus for communicating translation command information as recited in claim 1 wherein said cache control means includes means responsive to said translation miss signal for applying a steal command signal to said instruction unit to provide said translation command signal priority over execution of another thread.

3. Apparatus for communicating translation command information as recited in claim 1 wherein said translation control means including a translation sequencer means responsive to a translation miss condition for applying a series of said translation command signals.

4. Apparatus for communicating translation command information as recited in claim 3 wherein said translation control means includes means for receiving a translation command taken signal from said cache control means for a translation command signal and means for receiving a translation data valid signal from said cache control means for another translation command signal in one control cycle.

5. Apparatus for communicating translation command information as recited in claim 1 wherein said translation control means for controlling address flow includes a block address translation used for translating an effective address to a real address, and a segment lookaside buffer (SLB) used for translating an effective address to a virtual address.

6. Apparatus for communicating translation command information as recited in claim 5 wherein said translation control means for controlling address flow includes a translation lookaside buffer (TLB) used for translating said virtual address to a real address and wherein said translation miss condition includes no matching entry found in said SLB or no matching entry found in said TLB.

7. A computer implemented method for communicating translation command information in a multithreaded environment in a computer system including a processor unit, an instruction unit coupled to said processor unit, a cache coupled to said processor unit, a main memory, and a storage control unit including a dataflow control partition, a cache control partition, a translation control partition, said method comprising the steps of:

detecting a translation miss condition and sending a translation miss signal from said dataflow control partition to said translation control partition,     sending a translation command next signal from said translation control partition to said cache control partition, and     responsive to said translation command next signal, sending a translation command signal from said translation control partition to said cache control partition;

wherein said step of sending said translation command signal from said translation control partition to said cache control partition includes the step encoding said translation command signal for one of a Fetch STE/PTE (Page Table Entry/Segment Table Entry) command signal, a Byte Store command signal, a translation lookaside buffer (TLB) update for TLB parity error, and a Translation Lookaside Buffer Invalidate Entry (TLBIE) request command signal.

8. A computer implemented method for communicating translation command information as recited in claim 7 includes the step, responsive to said translation miss signal of, applying a steal command signal to said instruction unit from said cache control partition, whereby providing said translation command signal priority over execution of another thread.

9. A computer implemented method for communicating translation command information as recited in claim 7 includes the steps responsive to said translation miss condition, of applying a series of said translation command signals from said translation control partition to said cache control partition, and in one control cycle, said translation control partition is enabled to receive a translation command taken signal from said cache control partition for a translation command signal and to receive a translation data valid signal from said cache control partition for another translation command signal.

10. A computer system comprising:

a processor unit, an instruction unit coupled to said processor unit, a cache coupled to said processor unit, a main memory, and a storage control unit including dataflow control means for controlling dataflow, cache control means for controlling command flow, and translation control means for controlling address flow; said translation control means including         means responsive to a translation miss condition for applying a translation miss signal to said cache control means; and         means responsive to said translation miss signal for applying a translation command signal to said cache control means;

wherein said translation command signal is an encoded signal for one of a Fetch STE/PTE (Page Table Entry/Segment Table Entry) command signal, a Byte Store command signal, a translation lookaside buffer (TLB) update for TLB parity errors, and a Translation Lookaside Buffer Invalidate Entry (TLBIE) request command signal.

11. A computer system as recited in claim 10, wherein said cache control means for controlling command flow includes means responsive to said translation miss signal for applying a steal command signal to said instruction unit to provide said translation command signal priority over execution of another thread.

12. A computer system as recited in claim 11, includes means responsive to a load cache miss signal for deactivating said steal command signal to said instruction unit to allow another thread to execute.

13. A computer system as recited in claim 10, wherein said translation control means for controlling address flow includes a block address translation used for translating an effective address to a real address; a segment lookaside buffer (SLB) used for translating an effective address to a virtual address, a translation lookaside buffer (TLB) used for translating said virtual address to a real address and wherein said translation miss condition includes no matching entry found in said SLB or no matching entry found in said TLB.

\* \* \* \* \*